United States Patent [19]
Cordi et al.
[11] 3,811,115
[45] May 14, 1974

[54] ITEM LISTER USING A SHIFT REGISTER

[75] Inventors: Vincent A. Cordi, Vestal; Chester S. Gurski, Endwell, both of N.Y.

[73] Assignee: International Business Machines Corporation, Armonk, N.Y.

[22] Filed: Feb. 2, 1973

[21] Appl. No.: 329,265

[52] U.S. Cl. .......... 340/172.5
[51] Int. Cl. .......... G06f 15/40, G11c 19/00
[58] Field of Search .......... 340/172.5; 197/133 R

[56] References Cited

UNITED STATES PATENTS

| | | | |
|---|---|---|---|
| 3,586,833 | 6/1971 | Schafer | 340/172.5 |
| 3,167,003 | 1/1965 | Taylor | 340/172.5 |
| 3,597,739 | 8/1971 | Kolatis | 340/172.5 |
| 3,492,655 | 1/1970 | Deskevich et al. | 340/172.5 |
| 3,662,346 | 5/1972 | Tada | 340/172.5 |
| 3,678,462 | 7/1972 | Condon et al. | 340/172.5 |
| 3,176,819 | 4/1965 | Bloom, Jr. et al. | 197/133 R |
| 3,421,612 | 1/1969 | Pitt | 197/133 R |
| 3,568,155 | 3/1971 | Abraham | 340/172.5 |
| 3,462,411 | 8/1969 | Deskevich et al. | 340/172.5 |
| 3,571,808 | 2/1971 | Osaka | 340/172.5 |
| 3,634,332 | 1/1972 | 3,639,832 | 340/172.5 |
| 3,544,967 | 12/1970 | Sallach et al. | 340/172.5 |

*Primary Examiner*—Paul J. Henon
*Assistant Examiner*—Paul R. Woods
*Attorney, Agent, or Firm*—John C. Black

[57] ABSTRACT

A shift register store and associated controls store randomly entered classes of data records and output the data records on request by specific class in the identical order in which the records of the class were entered into the register. Records are compacted in the register so that no blank character codes exist between records. Blank codes exist only at the end of all valid records on the register. The register and controls are particularly useful in proof/inscribe/sort apparatus of the type used in bank proofing departments to permit the economic use of only one tape advance/print mechanism to produce specific class tapes for a multiplicity of sorter pockets, the documents sorted into each pocket being of the same class. The register and controls are useful in other environments, e.g., to buffer data from a plurality of terminals in a teleprocessing system.

8 Claims, 5 Drawing Figures

ITEM LISTER USING A SHIFT REGISTER

CROSS-REFERENCE TO RELATED APPLICATIONS

Certain of the subject matter shown and described herein is claimed in a copending application Docket EN972076 filed of even date herewith by the inventors herein and assigned to the same assignee as the present application.

BACKGROUND OF THE INVENTION

This invention relates to proof/inscribe/sorter apparatus having a low cost shift register memory that stores randomly entered classes of data records and outputs, upon request, a specific class of data records in the identical order in which they were entered.

In a typical batch listing operation, data is inputted to a processor via a keyboard, punched card, MICR (magnetic ink character recognition) reader, etc., and depending upon the type of data and/or other information contained on the source document, the data is to be listed on a tape associated with that class of data. Typically there is one tape lister and one tape printer for each class of data.

For example, consider the current mode of operation in many proof departments in the banking industry. The amount field on a check is keyed into an inscriber. Depending upon the routing transit information contained on the check, a stacker selector key is depressed. The document is mechanically transported to a specific document stacker and the amount keyed in is listed on a tape associated with the stacker. There is one paper tape roll and paper tape printer for each document stacker in the machine. The tape listing for each stacker corresponds sequentially with the physically stacked documents.

An alternative arrangement, shown in U. S. Pat. No. 3,176,819, provides a plurality of tape feed mechanisms on a chain printer for preparing the tape listings.

SUMMARY OF THE INVENTION

The above approaches are improved upon by an economic memory and print mechanism. The multiplicity of print stations are replaced by a shift register memory and a single printer. The human factors of the machine are also enhanced. The machine becomes more compact by the elimination of all but one tape and tape printer. Tapes do not obstruct access to the stackers. The operator need be concerned with only one tape which is printed when a stacker becomes full.

It is therefore a primary object of the present invention to provide in an inscriber - document stacker, an improved item lister mechanism and controls.

It is a more specific object to use only one print mechanism and a shift register means for an item lister in the proof/inscribe/distribution apparatus in proof departments of the banking industry.

It is another object to use, in the preferred embodiment, one low cost shift register memory and controls for storing randomly entered classes of data records and for retrieving the entries of each class of data records on request in the order in which the entries are entered into the memory.

Memory size is minimized in a number of ways:

Variable field lengths are accommodated.

As shift register memories are read out, isolated blanks in storage are created. This destroys the order of data and is wasteful of storage. The preferred embodiment of the present invention eliminates the creation of isolated blanks and maintains the desired algorithm of first-in-first-out (FIFO) listing of a specific class of data records.

A shift register can be used for each class of data records. In many applications the distribution of classes of data records is not uniform. Hence, one shift register becomes full while the other shift registers are sparce of data. In the preferred parallel organization described in this application, the upper limit of records of a given class that may be stored is the limit of the entire memory rather than one of several shift registers. It is therefore an object of the present invention to provide an item lister using a shift register and means for eliminating isolated blanks within the register.

It is a more specific object to provide a mechanism for organizing, storing and retrieving data in a serial by character shift register such that:

1. A multiplicity of records per record class may be stored and retrieved on a FIFO basis per class. That is, the records of a given class are retrievable in the same order that they were stored.
2. The length of a particular record is variable.
3. The number of records within a clas is variable up to the limits of the storage. That is, the number of records per class may vary from class to class with the needs up to the physical limit of the shift register storage.
4. Individual records of a class may be stored asynchronous to the processing of records of another class.
5. Individual (or a fixed multiple number of) characters of a record may be processed asynchronous to the processing of records of another class. That is, individual (or fixed length groups of characters) associated with different classes may be received concurrently and stored in the current records of their associated classes without interference.
6. Maximum efficiency in utilization of physical storage is maintained. That is, freed up space is automatically "garbage collected" and reorganized into a pool of free space immediately available for reuse.

The physical facilities provided in the preferred embodiment to facilitate the aforementioned functions include:

1. A serial-by-character shift register is utilized as the storage media. In the described embodiment, a parallel by bit serial by character shift register is described. However, any mechanism which can efficiently provide a similar serial-by-character storage media could well be applied.
2. A window (or register) providing storage for an individual (or fixed group of) character(s) is provided in the shift-register loop. This window provides the mechanism for storing or retrieving one (or a fixed length group of) character(s) per pass of the shift register. In addition, it provides the mechanism for temporarily changing the length of the shift register path by one (or a fixed length group of) character(s).
3. A single unique code identifies the beginning of the shift register (BOL) records.

4. Each class is uniquely identified by a unique code (address).
5. Each record of a given class which is stored is marked with the unique address associated with that class. The occurrence of a class adress in the window is uniquely recognizable from data and acts as the limiter for defining the length of a given record.
6. The relative order of appearance of the individual records of the class specifies the order of the records (FIFO), although the ordering of records among classes is irrelevant.
7. During retrieval of a record, the individual (or fixed length group of) character(s) captured in the window are replaced by null or blank data. This null data space is saved and inserted at the end of the legitimate data in the free space area hence providing garbage collection.
8. Introduction of a new record results in claiming new space on an individual (or fixed length group of) character(s) basis. The first information entered is the unique address of the class of the record being stored.

These objects are achieved in a preferred embodiment of the invention by writing each record and its class address at the end of all valid records in the memory. Data is held in the store with all records and their addresses following a BOL (beginning of line) code; the record in turn being followed by blanks (b̸). When a record is ready to be entered into the store, a search for the BOL code is initiated. When BOL is detected, a second search is made for the first subsequent blank (b̸) code, i.e., the end of all records in the store. The new record is then written into the store (over blank codes) immediately following the last record in the store. The store normally recycles data via a first path between its output and its input. During writing of the new record, the first path is opened; and a second path is closed for writing. At the end of the write operation, the first path is reestablished. In this way, isolated blanks between records are prevented.

When a stacker pocket becomes full, a read operation is initiated. A search for the BOL code at the output of the store is made. When BOL is detected, a search is made for the first record entry associated with the full pocket (i.e. having the class address associated with that pocket). The preferred embodiment uses a minimum of controls, and, therefore, only one entry is read out of the store 1 for each revolution of data therein. After each entry is read out, the search for BOL and the search for the first associated record entry are repeated. The following characters of that record are read out, deleted and printed one by one per storage cycle until finally the address of the record is read out and deleted. Thereupon search for the next record is initiated and the entire operation is repeated until no further associated records exist in storage.

To prevent isolated blanks between records in the store, the store length is increased by one entry (gating a register) each time BOL is detected and a blank (or fixed number of blanks) is inserted ahead of BOL (i.e. at the end of the line). When a record entry (character or address) is read out, the store length is immediately decreased by one entry thus eliminating isolated blanks.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The data format for the shift register store 1 to be described below is shown in the following table:

TABLE

| | | |
|---|---|---|
| b̸ | end of line | |
| . | | |
| b̸ | | |
| b̸ | | |
| b̸ | | |
| Cn | Record No. n | |
| . | | |
| Cn | | |
| . | | |
| C3 | Record No. 2 | |
| C2 | | |
| C1 | | |
| CLASS ADDR. | | |
| Cn | Character n | |
| . | | Record No. 1 |
| C2 | | |
| C1 | Character 1 | |
| CLASS ADDR. | Class Address | |
| BOL | Beginning of Line | |

By way of example, a bit code is assumed. BOL is a unique code which identifies the Beginning of the Line; and b̸ is a unique code for each blank. The beginning of each document record is identified by a class pocket address, i.e., a unique class address for each class of data records to be processed. The characters (decimal numbers) require ten code combinations, leaving twenty unique combinations for record addresses, i.e. twenty classes of data in the embodiment illustrated. The record length is variable including characters (decimal numbers) C1–Cn inclusive, and the combination of five bits comprising a character is processed in parallel.

Figure 1:
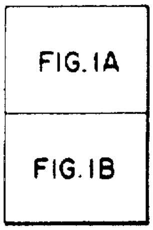
FIG. 1 shows the arrangement of FIGS. 1A and 1B.
Figure 1A:
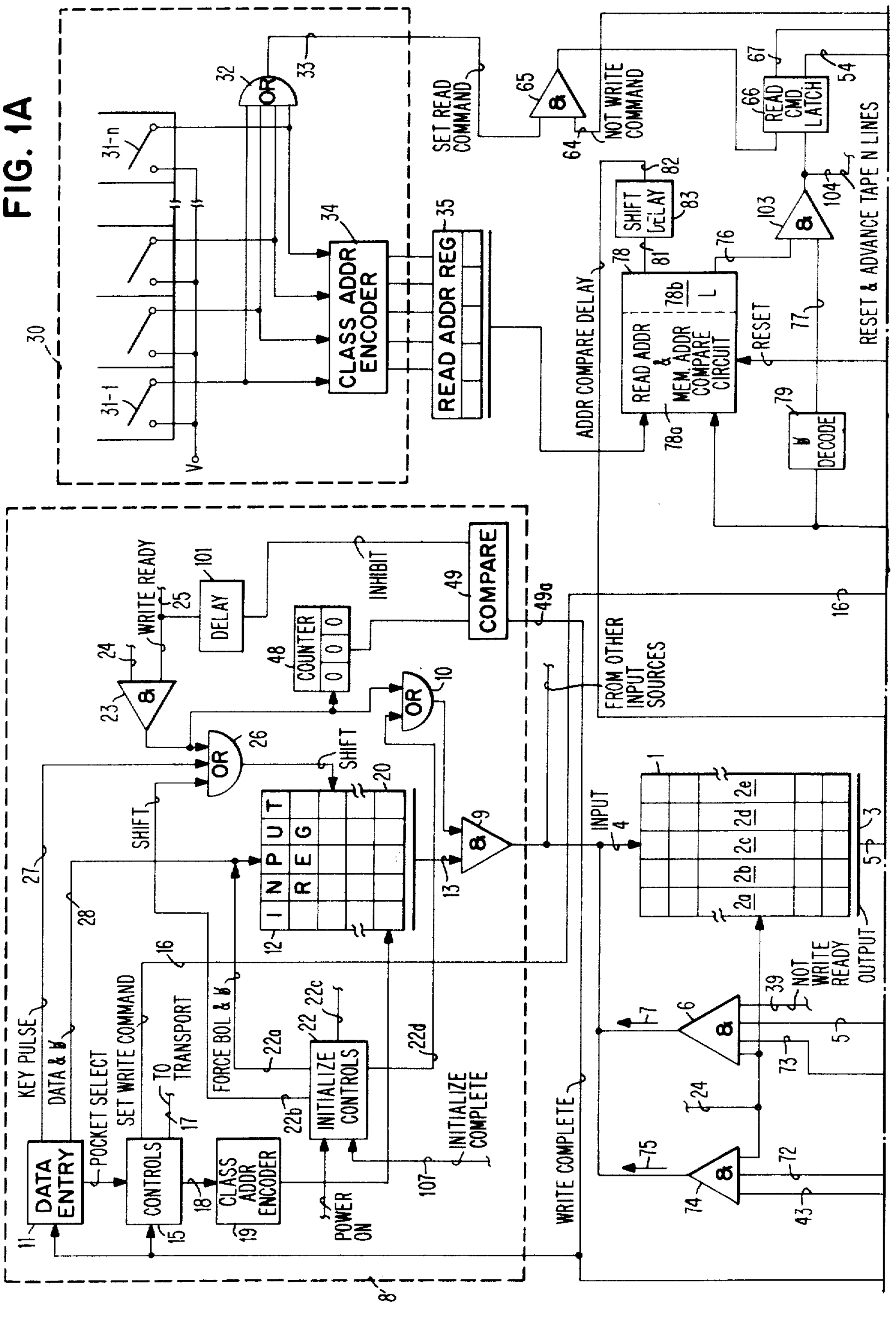
FIGS. 1A and 1B are schematic diagrams of the preferred shift register storage and controls for use with the improved item lister.
Figure 1B:
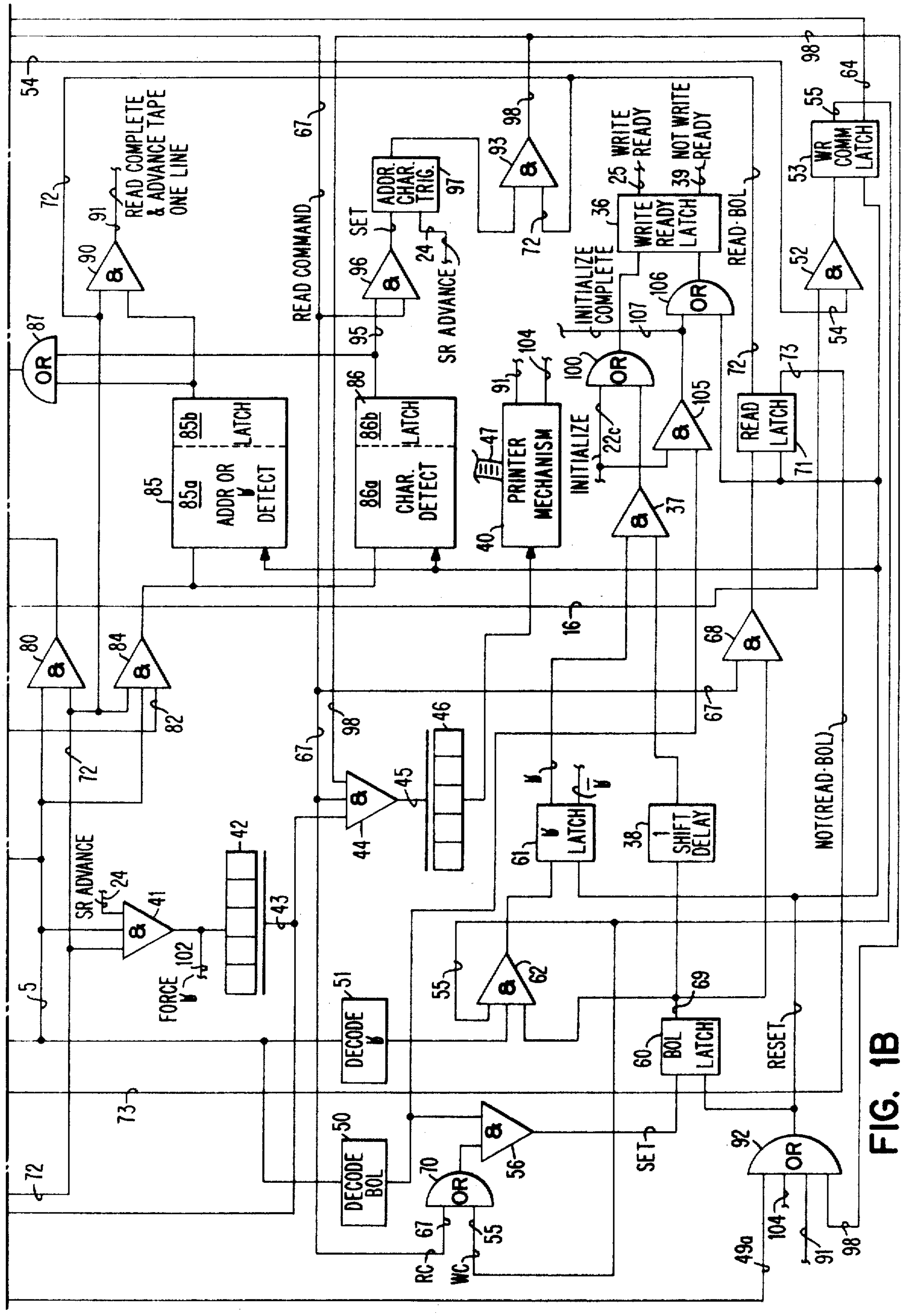

The preferred embodiment of FIGS. 1A and 1B includes the shift register store 1. In the preferred embodiment the store 1 includes five shift registers 2*a*–2*e* inclusive which are operated in parallel so as to store five bit code characters. For purposes of the present application, it will be assumed that a clock mechanism (not shown) produces pulses on line 24 to continuously sequence the memory 1 so that the data characters stored therein are being continuously recycled step by step from an output 3 of the store 1 to an input 4 of the store 1 via bus 5, gating circuit 6 and bus 7.

Data is entered into the store 1 from a data entry unit 8 via gating circuits 9 and the input 4. The data entry unit 8 can be any one of a number of conventional units such as a keyboard, a card reader, a MICR reader, or the like. The unit 8 includes a data entry element 11 which is controlled to enter document record data serially by character parallel by bit into a shift register 12, the output of which is coupled to the input of the gating circuits 9 by way of a bus 13. It will be assumed for purposes of the present description that the data entry unit 8 is preferably in the form of a keyboard data entry unit of conventional construction.

The entry unit 8 also includes a keyboard control circuit 15 having an output 16 for initiating the writing of data from the shift register 12 to the store 1. An output 17 of controls 15 is utilized to control the transport mechanism (not shown) of a sorter 30 so as to deliver each document to the correct pocket of the sorter. Output 18 of the keyboard controls 15 is applied to a class or pocket address encoder circuit 19, the output of which is coupled directly to the last stage 20 of the shift register 12 for the purpose of transferring the class address together with the corresponding document data to the store 1.

An initialization control circuit 22 is provided in the unit 8 for the purpose of entering the special code BOL (beginning of line) followed by blanks (ƀ) into the store 1 by way of the shift register 12, bus 13 and gating circuits 9. These utilization circuits are rendered effective each time that the power is turned on. BOL and blank codes on output bus **22*a* of initialization circuit 22 are gated into shift register 12 by shift pulses on output 22*b*. After the shift register 12 is full, a pulse on output 22*c* sets a write ready latch 36 to initiate the transfer of entries from the shift register 12 to store 1. Blanks are stored in the shift register 12 and transferred to store 1 until store 1 is full. Pulses on line 22*d* control the transfer from shift register 12 to store 1. When the store 1 is full, the BOL code will appear at the output 3. Decode circuit 50 will decode the BOL code and reset latch 36 via AND circuit 105 and OR circuit 106. Initialization is terminated by a signal on the output 107 of circuit 105**.

The shift register 12 includes in addition to the last stage 20, one additional stage for each character position on the documents being scanned. Thus if the documents have a maximum of seven character positions which are scanned, there will be seven stages in the shift register 12 in addition o the last stage 20. In the event that a particular document is scanned and there are only five characters on the document, the five characters will be entered into the shift register 12 followed by two blank characters. This renders the controls much more simple for transferring data between the shift register 12 and the store 1.

Each time that a write operation is initiated between the shift register 12 and the store 1, the new data is entered immediately following the valid data already stored in the store 1; and the new data will be written over blanks. Thus writing blanks at the end of valid data in shift register 12 into the store 1 leaves store 1 with continuous valid data uninterrupted by blanks therebetween.

Data shifting means for the shift register 12 includes OR circuits 10 and 26 and an AND circuit 23 having a clock input 24, a WRITE READY input 25. When transferring data from the shift register 12 to store 1, clock signals on line 24 advance shift register 12 in synchronism with data shifting in store 1.

Shift signals on line 27 gate each record character on bus 28 into the shift register 12 and advance counter 48. After the desired number of characters (in this embodiment a maximum of seven characters) from unit 11 are stored in shift register 12, a pocket selection code is transferred from the element 11 to controls 15. Controls 15, which are not a part of the present improvement, are designed such that data entered into shift register 12 is shifted to the position adjacent to position 20 and blanks are appropriately filled in. Then the class address is transferred from encoder 19 to register position 20.

The transfer of data from the shift register 12 to the store 1 will be referred to in this application as a write operation. When a write operation is initiated, it is necessary to determine the location of the last valid data entry in the store 1 so that the new data can be entered immediately thereafter. As indicated above, it will be assumed that the store 1 is continually recycling data through the store and from its output 3 to its input 4 via the buses 5 and 7 and the gating circuits 6.

At the same time the output data from the store 1 is also transferred by way of the bus 5 to a pair of decode circuits 50 and 51 for respectively decoding the unique codes BOL and blank (ƀ).

As described above, the controls 15 initiate a write operation by applying a signal to the output 16 after the register 12 has been filled with data from one document and with the class address of the pocket to which the document is to be transferred. The signal on output 16 is applied to an AND circuit 52 for setting a write command latch 53. The AND circuit 52 prevents the initiation of a write operation in the event that a read operation is already in progress at the time that the controls 15 initiate the write operation, i.e., when a logical 0 signal exists on a NOT READ COMMAND line 54 to degate the AND circuit 52. The entry unit 8 is rendered ineffective for writing further information into the store 1 until the existing read operation is completed.

Assuming that there is no read operation in progress, the WRITE COMAND latch 53 is set and applies a signal to its output line 55 to condition the AND circuit 56 via OR circuit 70.

When the decode circuit 50 thereafter detects the BOL code at the output of store 1, it causes the AND gate 56 to apply a signal to its output to set a BOL latch 60. Thereafter upon the detection of the first blank code at the output of the store 1 by the decode circuit 51 a blank latch 61 is set by way of an AND circuit 62 having inputs from the BOL latch 60, decode circuit 51 and the WRITE COMMAND line 55 from latch 53.

The outputs of the latches 60 and 61 set a WRITE READY latch 36 via AND circuit 37 and OR circuit 100. The output 69 of latch 60 is coupled to AND circuit 37 by way of a delay circuit 38 which prevents the setting of latch 36 for one shift register advance time of store 1. This delay insures recycling of the BOL code to the input 4 of store 1 via path 7 when a blank code immediately follows the BOL code (i.e., no records in store 1).

When latch 36 is set, it removes the complementary output signal from line 39 to degate circuits 6 in path 7. Latch 36 also applies a signal to its true output 25. This WRITE READY signal gates AND circuit 23 as described above to transfer the document record from the shift register 12 to the store 1. As described above, the shift register 12 and the store 1 are advanced in synchronism to transfer the address and seven character entries one at a time behind the BOL code or the last record in the store 1. As each entry is transferred a three bit position counter 48 is incremented. After a count of eight, counter 48 is in its original all zeros state, and compare circuit 49 detects this state; frees the entry device 8 and resets latches 60, 61 and 36 via its output 49*a* and OR circuit 92. A delay circuit 101 inhibits the compare circuit 49 for one shift cycle after the signal is applied to line 25.

The document sorter 30 includes switches 31-*l* to 31-*n* each of which is adapted to be closed to make electrical contact when its respective document pocket is filled. Each of these switches, when closed, applies a signal to an OR circuit 32 to apply a signal to a READ COMMAND line 33. Each switch, when closed, also applies a signal to a class or pocket address encoder 34 which produces an output identifying the particular class address associated with the particular pocket which is filled. This class address data is transferred to a READ ADDRESS register 35.

When a pocket is full and a read operation is initiated, data is transferred character by character from the output 3 of the store 1 to a print mechanism 40 by way of the bus 5, gating circuits 41, a a window register 42, a bus 43, gating circuits 44, a bus 45, and an output register 46. The records for all documents in the full pocket are printed out on the tape 47 during the read operation in the order in which they were transferred from the unit 8 into the store 1.

The print mechanism 40 and its tape 47 serve all pockets. As each pocket becomes full, its records are retrieved from store 1 and printed on the paper tape 47 in sequence. The tape containing the records is ripped off and secured around the corresponding documents removed from the full pocket. The print mechanism is then ready to print records on the tape 47 for the next pocket which becomes full. Removal of documents from a pocket breaks electrical contact to OR circuit 32 and class encoder 34.

The read operation is initiated when one of the pocket full switches 31-*l* to 31-*n* applies a pulse to the SET READ COMMAND line 33. A search is made in store 1 for all record data corresponding to the documents in the full pocket. Assuming there is no write operation going on and therefore no signal on the NOT WRITE COMMAND line 64, the SET READ COMMAND signal on line 33 will be passed by the AND circuit 65 to set the READ COMMAND latch 66. The READ COMMAND output line 67 is connected to an AND circuit 68, the other input of which is the output line 69 of the BOL latch 60. The READ COMMAND line 67 is also applied to the AND circuit 56 by way of the OR circuit 70. The controls are now ready to search for the BOL code in the store 1.

The AND circuit 56, as described above, extends the output of the BOL decode circuit 50 to the BOL latch 60 to set the latter when the BOL code is detected at the output 3 of the store 1. Consequently the next time that the BOL code appears in the last stage of the store 1, it will cause the decode circuit 50 and the AND circuit 56 to set the latch 60. This will cause AND circuit 68 to set the READ latch 71.

When the latch 71 is set, a READ AND BOL signal is applied to the latch output line 72 which forms an input to an AND circuit 74 for rendering effective a second data recirculating path 75 from the output 3 of the store 1 to its input 4. At the same time the latch 71 removes the NOT READ AND BOL signal from the line 73 which forms an input to the AND circuit 6. As described above, this AND circuit 6, when its inputs are satisfied, completes the path 7 from the output 3 of the store 1 to the input 4. Thus latch 71 opens path 7 and closes path 75 when it is set.

The path 75 includes the gating circuits 41, the register 42 and its output bus 43 and gating circuits 74.

This switching from path 7 to path 75 effectively increases the shift register length of store 1 by one position, i.e. register 42. A blank code (ƀ) will have been forced into register 42 via line 102. This blank code is gated into path 75 when the signal on line 72 gates circuits 74 and 41. The BOL code is shifted into register 42 by circuits 41. The controls are now ready to search for a record in store 1 corresponding to documents in the full pocket.

Figure 3:
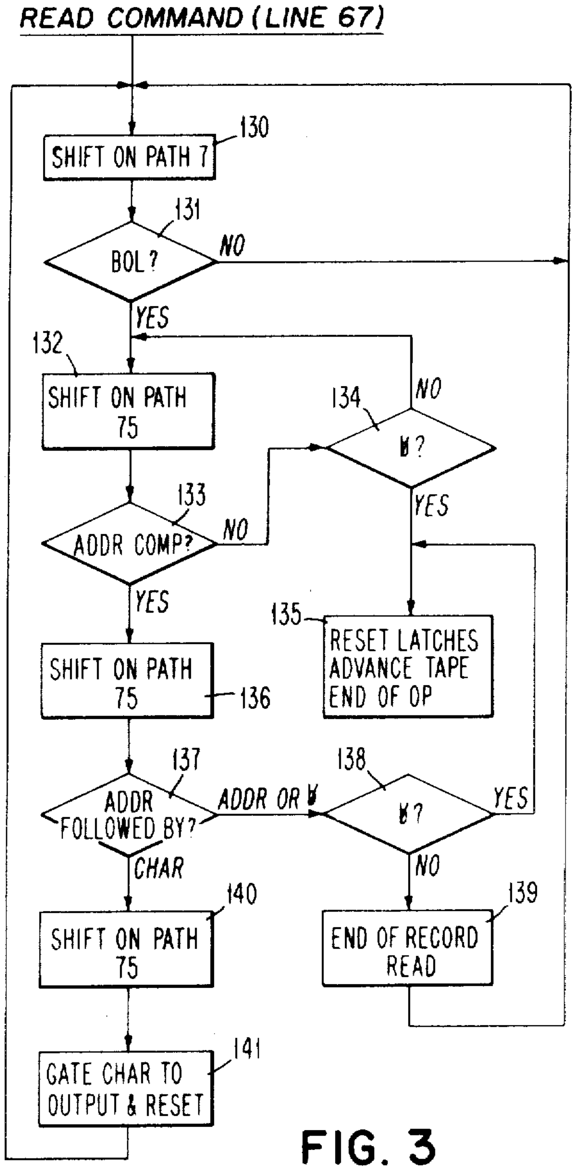

It will be seen from the flowchart of FIG. 3 that the contents of store 1 must be shifted through one complete revolution for each character to be read out and printed on tape 47. During each revolution, shifting of data from the output 3 of the store 1 through path 75 to the input 4 of the store 1 continues until either (1) an address compare occurs between the address in register 35 and the address in the last stage of the store 1 or (2) a blank character is detected at the output of the store 1. Detection of an address compare initiates the removal of a class address or a character from store 1 via register 42.

Detection of a blank code ƀ at the output of the store 1 (when no address compare is found) signifies the end of valid data in store 1 for the class being searched and the end of the read operation. All latches must be reset.

Circuits 78 compare each entry in the last stage of store 1 with the full pocket address in register 35. The entries in store 1 are coupled to circuits 78 and 79 by gating circuits 80 when the READ AND BOL signal from read latch 71 is applied to the line 72. Conventional compare circuits 78*a* set latch 78*b* when an equal compare occurs. When set, latch 78*b* applies a signal to its output 81; and this signal is applied to an ADDRESS COMPARE DELAY line 82 by way of a delay circuit 83.

The circuit 83 delays the signal a time interval equal to the time between shift pulses in store 1. This causes a gating circuit 84 to be rendered effective immediately after the full pocket address which caused the compare is transferred from store 1 to register 42 at the next shift time.

When the delayed signal on line 82 activates the gating circuits 84, the next entry in store 1 following the full pocket address is gated to circuits 85 and 86. The circuits 85 include conventional detection circuits 85*a* which determine whether or not the entry is one of the address codes or the blank (ƀ) code. If the entry is an address or blank code, a latch 85*b* is set. If the entry is one of the character set (e.g. numerals 0–9), detection circuits 86*a* set a latch 86*b*.

Either latch 85*b* or latch 86*b* must be set and in either event they reset latch 78*b* via OR circuit 87 to end a search cycle for one entry.

The settng of latch 85*b* by an address signifies the end of a record which has been read out to the printer 40 character by character. It also signifies the end of all records in the class when a blank code is detected. In either event, an AND circuit 90 produces an output signal on line 91 which resets latches 60 and 71 via OR circuit 92. Resetting of latch 71 opens path 75 and closes path 7 via gating circuits 74 and 6. It also degates circuits 41, 80, 84, 90 and 93.

Opening of path 75 and closing of path 7 shortens the recirculating path of store 1 by one position, the full pocket address in register 42 thereby being removed from store 1 since it has no additional record characters associated with it. A new search for the BOL code and the full pocket address in store 1 is initiated.

In the event that detection of a blank code sets latch 85b, decode 79 will have detected the blank code and prepared AND circuit 103 via line 77. Subsequent resetting of latch 78b by circuit 85 produces a signal on output 76 to gate AND circuit 103 and reset the latch 66. For purposes of this application, it is assumed that the documents will have been removed from the full pocket, thereby opening the pocket switch 31.

When the entry following a full pocket address is one of the record character set, latch **86*b* is set as described above. Its output 95 and the signal on line 67 gate AND circuit 96 to prepare an address character trigger 97** which is preferably in the form of a single shot multivibrator.

When the next shift register advance pulse occurs on line 24 to shift the character to register 42, the advance pulse also triggers single shot 97 to produce an output pulse which gates AND circuit 93. An output pulse on line 98 gates the character from register 42 to register 46 via gating circuits 44. The printer 40 prints the character on tape 47 and advances the tape one line. The output pulse on line 98 also resets latches 60, 71 via OR circuit 92. The path is again shortened (i.e., 75 opened and 7 closed), the character in register 42 being removed from storage. The mechanism is now ready to search for the code BOL and any additional data associated with the full pocket.

When the last record associated with the full pocket is not the last record in the store 1, the latch **85*b* is set by an address rather than a blank. During the next search cycle, no class address compare will occur in circuits 78*b* since all record data for the full pocket has been removed from the store 1. When the first blank (b̸) is detected by decode circuit 79, it resets latch 66 via AND circuit 103. Output 104 of circuit 103 resets latches 60, 61, 71 via OR circuit 92, and causes the print mechanism 40 to advance the tape 47** a selected number of lines N so that the tape with the document records can be torn off.

Figure 2:
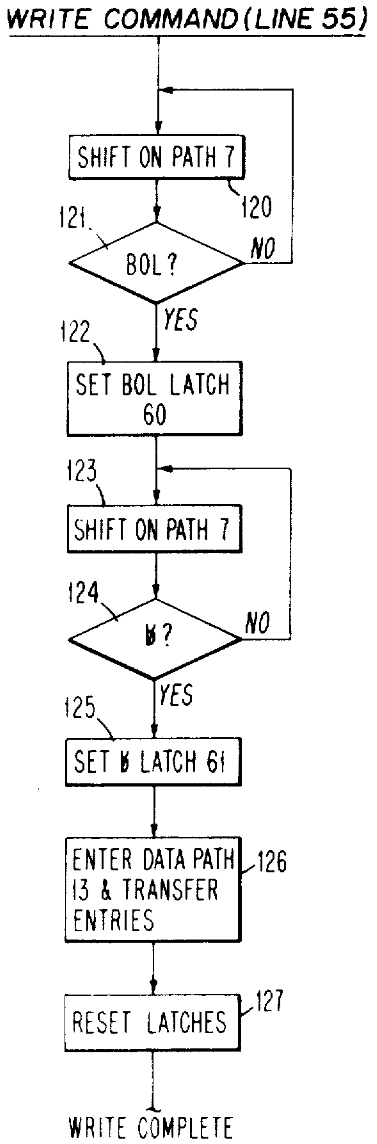
FIGS. 2 and 3 are flow diagrams illustrating the operation of the embodiment of FIGS. 1A and 1B during write and read operations respectively.

Reference is directed to the flowchart of FIG. 2 which illustrates the write operation performed after a document record and its pocket address have been entered into shift register 12. The first two steps 120 and 121 illustrate the recycling of entries in store 1 via path 7 until the BOL code is detected by decode circuit 50 (FIG. 1B). Step 122 illustrates setting of latch 60 via AND circuit 56.

Steps 123 and 124 illustrate the continued recycling of entries in store 1 via path 7 until the first blank (b̸) is detected by decode circuit 51. Step 125 illustrates setting of the latch 61 via AND circuit 55.

Step 126 illustrates rendering path 13 effective and path 7 ineffective so that the address entry and seven character (or blank) entries in shift register 12 can be transferred to store 1.

Step 127 illustrates resetting of the various latches to complete the write operation after the entries have been transferred to store 1.

FIG. 3 illustrates the read operation after a READ COMMAND signal appears on line 67 of FIG. 1A incident to a pocket being filled with documents. Steps 130 and 131 illustrate recycling of entries in store 1 via path 7 until decode circuit 50 detects the BOL code at the output 3 of store 1, setting latches 60 and 71.

Step 132 illustrates the recycling of entries in store 1 via path 75 incident to the setting of latch 71. Steps 133 and 134 together with step 132 illustrate the search for either an address compare (in circuits 78) or a blank (in circuit 79). Detection of a blank at step 134 transfers control to step 135 to reset the control latches, advance the tape 47 and terminate the read operation by resetting the latch 66.

Detection of an address compare at step 133 permits one more shift in store 1, i.e. step 136. Step 137 determines whether the new entry at the output 3 of store 1 following the address compare entry of step 133 is a character (circuit 86) or alternatively another address or blank (circuit 85).

If the new entry is a blank (step 138), all records have been read out; and control is transferred to step 135 to end the read operation (i.e., latch **85*b* resets latch 78*b* which, with decode circuit 79, resets latch 66 via AND circuit 103**).

If the new entry is an address, control is transferred from step 138 to step 139 indicating that all characters of one record have been read out. Step 139 resets latches 60, 71 and transfers control to step 130 to initiate a new search for BOL and for additional record entries associated with the full pocket.

If the new entry is a character, control is transferred from step 137 to step 140 which shifts the address compare entry of step 133 into the input 4 of store 1 via path 75 and which shifts the character into register 42. The character is then gated from register 42 to register 46 by AND circuit 93 (step 141), and the latches 60 and 71 are reset. Control then passes to step 130 to initiate a new search for BOL and for additional record entries associated with the full pocket.

It will be appreciated that many modifications can be made by those of average skill in the art without departing from the teachings of the invention. For example, independently controlled shift registers can be provided for eliminating blanks between data; entire records can be entered and stored in parallel in a shift register means, particularly those implemented in the relatively new bubble domain technology, thereby vastly increasing speed of operation. It is comtemplated that such modifications are covered by the appended claims.

The time required for the read operation can be shortened by adding to the hardware. For example, an eight stage shift register can be substituted for register 42 and minor modification of the controls made so that eight blanks can be inserted behind BOL at the initiation of a read operation and so that an entire record (address and seven characters) can be read out from the store 1 in one revolution of the data through store 1.

Further, the input mechanism 8 can be simplified by removing shift register 12 and utilizing a single character write per storage cycle assuming appropriate modification to permit class address insertion. Alternatively, multiple input mechanisms 8 may be attached with appropriate modification to permit use as a clustered input machine servicing a multiplicity of operators.

While the invention has been particularly shown and described with reference to a preferred embodiment thereof, it will be understood by those skilled in the art that various changes in form and details may be made therein without departing from the spirit and scope of the invention.

We claim:

1. In apparatus of the type in which documents are sorted by class into respective pockets of stacking apparatus and in which data recorded on the documents is printed on tape by class so that each sorted class of documents can be obtained with a respective tape having recorded thereon the data associated with the class of documents, the combination comprising shift register means including means for recirculating data therein, means effective when the documents are transported to selected pockets for storing the corresponding data into the shift register means in the order in which the documents are sorted, means effective when a pocket is full for retrieving data associated with the documents in the full pocket from the shift register means in the same sequence in which it is stored into the latter means, means for maintaining the document data in contiguous positions of the shift register means free of intervening blanks, and a single tape advance and print mechanism controlled in accordance with said retrieved data for printing the tapes by class for documents sorted into different pockets.

2. The combination set forth in claim 1 wherein the data associated with each document includes a number of characters each character being represented in the shift register means by a plurality of logical bits, said shift register means comprising a plurality of parallel operated shift registers, one for each logical bit of the characters, for storing the data serial by character and parallel by bit.

3. In apparatus of the type in which documents are sorted by class into respective pockets of stacking apparatus and in which data recorded on the documents is printed on tape by class so that each sorted class of documents can be obtained with a respective tape having recorded thereon the data associated with the class of documents, the combination comprising shift register means including means for recirculating data therein, means effective when the documents are transported to selected pockets for storing the corresponding data into the shift register means, means effective when a pocket is full for retrieving data associated with the documents in the full pocket from the shift register means, and a single tape advance and print mechanism controlled in accordance with said retrieved data for printing the tapes for documents sorted into different pockets.

4. The combination set forth in claim 3 further comprising means for maintaining the document data in contiguous positions of the shift register means free of intervening blanks.

5. The combination set forth in claim 3 wherein the data associated with each document includes a number of characters each character being represented in the shift register means by a plurality of logical bits, said shift register means comprising a plurality of parallel operated shift registers, one for each logical bit of the characters, for storing the data serial by character and parallel by bit.

6. The combination set forth in claim 5 further comprising means for maintaining the document data in contiguous positions of the shift register means free of intervening blanks.

7. In apparatus of the type in which documents are sorted by class into respective pockets of stacking apparatus and in which data recorded on the documents is printed on tape by class so that each sorted class of documents can be obtained with a respective tape having recorded thereon the data associated with the class of documents, the combination comprising a shift register store having an input and an output, storing data serial by group parallel by bit and having a unique beginning-of-line code stored therein, means including a first path coupled to the store input for entering document data and corresponding pocket identity data into the store as the documents are sorted, means controlled by a pocket full condition, the corresponding pocket identity data and the unique code for removing from the store for printing the data associated with the documents in the full pocket in the same sequence in which the latter data was entered into the store, and including means coupling the store output to the store input for re-entering the remaining data into the store in contiguous positions thereof following said unique code, and a single tape advance and print mechanism controlled in accordance with said retrieved data for printing the tapes by class for documents sorted into different pockets.

8. In apparatus of the type in which documents are sorted by class into respective pockets of stacking apparatus and in which data recorded on the documents is printed on tape by class so that each sorted class of documents can be obtained with a respective tape having recorded thereon the data associated with the class of documents, the combination comprising a shift register store having an input and an output and adapted to be initialized with a unique code entry and blank code entries stored therein, means forming a first path from the output to the input normally effective for recirculating entries in the store, means forming a second path from the output to the input and including storage means for extending the effective length of the store, means controlled by the unique code entry and the first blank code entry following the unique code entry when a document is sorted for storing corresponding document and class identity data entries into the store starting at the position of said first blank entry and including means for rendering said first path ineffective during said sorting, means controlled by the unique code entry and by each class identity data entry of a requested class when a read request occurs for rendering the second path effective and the first path ineffective to insert a selected number of blank code entries into the store preceding the unique code entry and for thereafter rendering the first path effective and the second path ineffective to remove entries of the requested class, equal in number to the inserted blank code entries, from the store in a sequence related to the order in which the record data was stored, and a single tape advance and print mechanism controlled in accordance with said removed entries for printing the tapes by class for documents sorted into different pockets.

* * * * *

PO-1050
(5/69)

UNITED STATES PATENT OFFICE
CERTIFICATE OF CORRECTION

Patent No. 3,811,115 Dated May 14, 1974

Inventor(s) Vincent A. Cordi and Chester S. Gurski

It is certified that error appears in the above-identified patent and that said Letters Patent are hereby corrected as shown below:

On the cover sheet, under the heading [56] "References Cited - UNITED STATES PATENTS", the reference "3,634,332 1/1972 3,639,832.........340/172.5" should read --3,634,832 1/1972 Taddei.........340/172.5--.

Column 2, line 16, the sentence beginning "It is therefore" should be indented as a new paragraph; line 28, "clas" should be --class--. Column 8, line 62, "settng" should be --setting--. Column 12, line 67, "sorting" should be --storing--.

Signed and sealed this 17th day of September 1974.

(SEAL)
Attest:

McCOY M. GIBSON JR.
Attesting Officer

C. MARSHALL DANN
Commissioner of Patents